Figure 1:
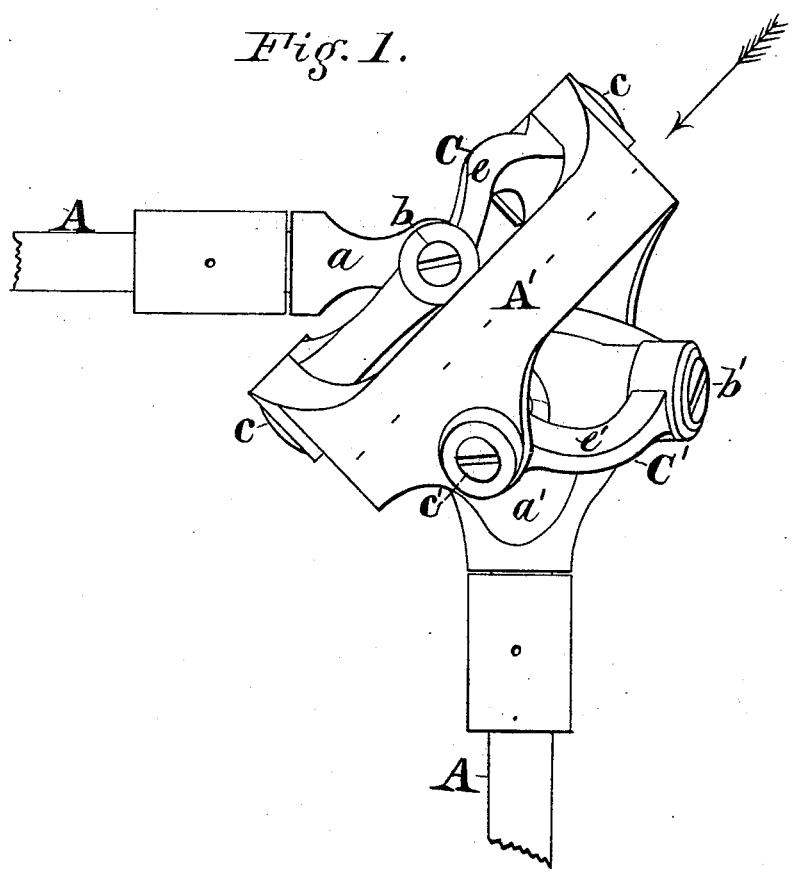

(Model.)  2 Sheets—Sheet 1.

J. STATE.
Shaft Coupling.

No. 238,454.  Patented March 1, 1881.

Attest.
M. M. Converse
Ora Converse

Inventor.
John State
B. C. Converse, Atty.

(Model.)

2 Sheets—Sheet 2.

J. STATE.
Shaft Coupling.

No. 238,454. Patented March 1, 1881.

Attest.
M. M. Converse.
Ora Converse.

Inventor:
John State,
B. C. Converse, Atty.

N. PETERS, PHOTO-LITHOGRAPHER, WASHINGTON, D. C.

United States Patent Office.

JOHN STATE, OF SPRINGFIELD, OHIO, ASSIGNOR TO FERDINAND STATE, OF SAME PLACE.

SHAFT-COUPLING.

SPECIFICATION forming part of Letters Patent No. 238,454, dated March 1, 1881.

Application filed September 27, 1880. (Model.)

*To all whom it may concern:*

Be it known that I, JOHN STATE, of the city of Springfield, in the county of Clarke and State of Ohio, one of the United States of America, have invented a new and useful Improvement in Shaft-Couplings, of which the following is a specification.

My invention relates to that class of shaft-couplings in which the shafts connected by them can be run at an angle with each other, and are termed "universal."

My invention consists in a novel mode of coupling the shafts, differing from those in use in certain essential points, which will be hereinafter more fully explained.

In universal couplings or joints heretofore used, when the shafts are at any considerable angle to each other the coupling is liable to bind and not to run free. From its peculiar construction it is also liable to much wear, to become noisy, and to get out of order. Hence the ordinary bevel-gear, with all the objections which may be urged against it, is still used where a complete universal shaft-coupling free from the defects above named might be substituted for it. The ball-and-socket coupling with and without an interposed link or ring were among the first forms used. The coupling of Doctor Hooke, with two forks having their extremities pivoted at right angles to the arms of a rigid cross, was another form. This was subsequently modified by the insertion of an interposed link in place of the cross and pivotal pins through the forks. Ball-and-socket couplings again appeared in various modified forms: first, with the shell slotted and pins extending from the ball through these diametrically, also balls with angular sides, and also with raised zones, each fitting into shells or sockets of same (reversed) form, were among the many different forms of universal joint or coupling. In all these the difficulties of excessive friction and wear with vibratory and unsteady motion have prevented their common usage.

In my improvement the object is to overcome the defects above enumerated, incident to all universal couplings heretofore in use, and to make a joint which is noiseless and durable; also, which will turn freely at any desired angle, and in which the velocity ratio will not fluctuate, thus avoiding any tendency to vibratory and unsteady motion.

In my improvement the ends of the shafts to be connected are formed into a head, having a hole extending through it at right angles to the line of the shaft. In each one a circular yoke, having a pin extending diametrically across it through the shaft-head, pivots the yoke to the latter. At right angles with this pin the sides of the yoke are also pivoted to the inside of a wide flat circular ring, within which the yokes perform their movements. Unlike any other form of universal or gimbal joint, the pivoted points of connection with this ring are not at right angles with each other, but lines extended through their axes would cross each other at an angle of about seventy degrees. This is a novel feature in my invention. The ring revolves centrally, bisecting the plane of the shafts, through the angle formed by their connection, into equal parts.

Figure 2:
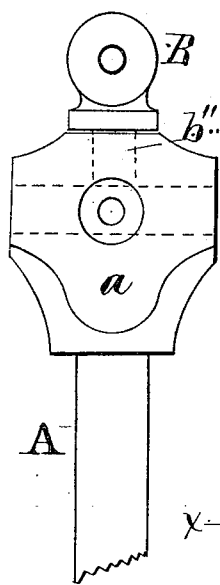
Figure 3:
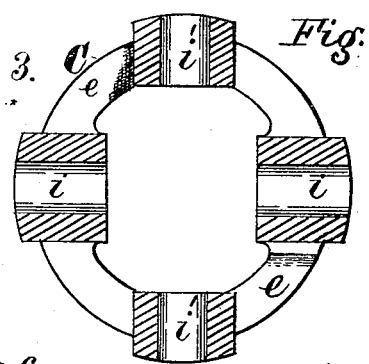
Figure 4:
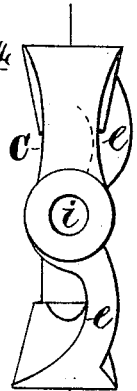
Figure 5:
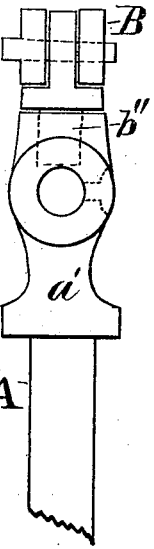
Figure 6:
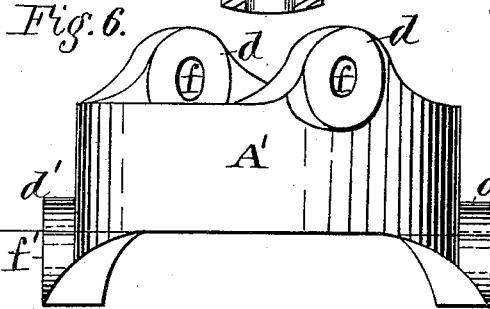
Figure 7:
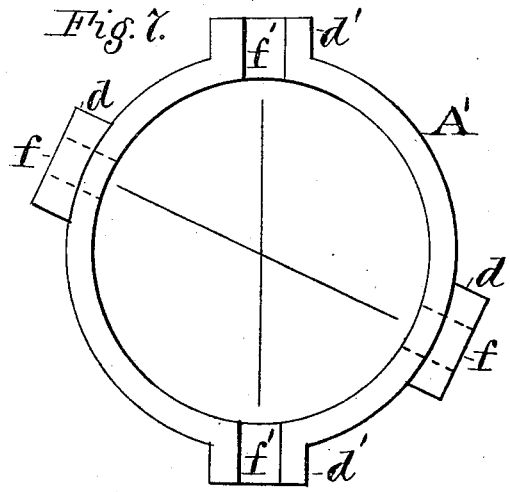
Figure 8:
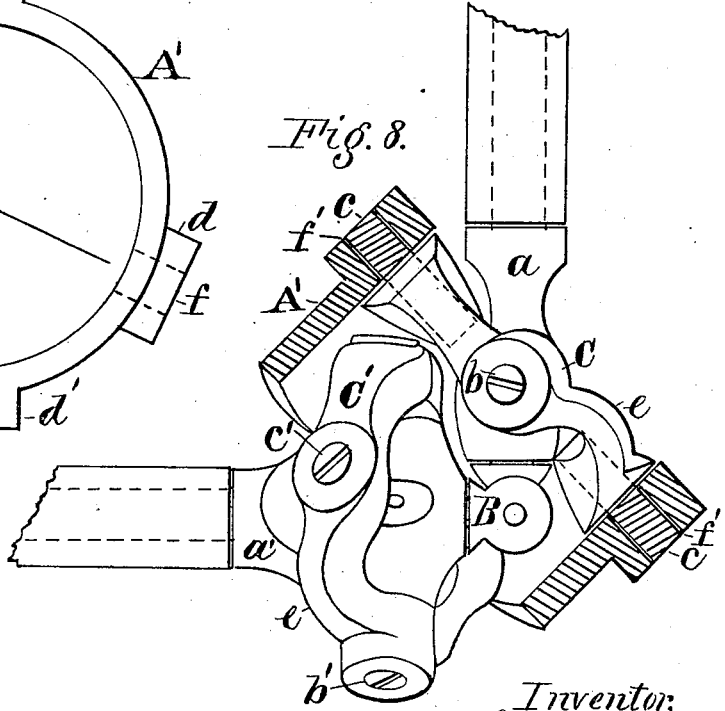

Figure 1 is a perspective view of my improved coupling. Fig. 2 is a plan view of one of the shaft-heads. Fig. 3 is a vertical section of one of the yokes through line $z$, Fig. 4, which latter is an edge view of the yoke, taken in line of its axial pin which pivots it to the head. Fig. 5 is an edge view of one of the shaft-heads. Fig. 6 is a perspective view of the ring within which the yokes operate, and to which they are both pivoted. Fig. 7 is an edge view of the upper section of the ring shown in Fig. 6, through line $x$. Fig. 8 is a top view of the coupling with the upper half-section of the ring removed.

A A are two shaft-sections. Their heads $a$ $a'$ are made broad, and at the end are bored through edgewise at right angles with the shaft, as seen in dotted lines in Fig. 2, and also in Fig. 5, in which the circular hole $g$ is seen. A circular yoke, C and C', is pivoted upon each head by a screw-pin, $b$ and $b'$, extending diametrically through the holes $i$ (see Figs. 3 and 4) and through the hole $g$ in the head. Bosses are formed on the yoke on opposite sides, at right angles to each other, through which the main pivot-pins $b$ and $b'$ extend, and also the pins $c$ and $c'$, which pivot the two other opposite sides of the yoke to the ring A', as seen in the figures, $i\ i$ in Fig. 3 being for the main pins $b\ b'$, and $i'\ i'$ for the pins $c\ c'$. In the views, Figs. 6 and 7, the holes $f$ in the bosses $d$ (also formed on the ring) show the points where the yokes are pivoted to the latter. These bosses are formed to give the pins on both yokes and ring a more extended bearing.

By reference to the several figures, and particularly to Figs. 1, 6, and 8, it will be seen that ring $A'$ has a wide face, and that lines cutting the axes of the two sets of ring-pins $c\ c'$ (extending circumferentially around it) are wide apart to give room for the operation of the yokes. In Fig. 6 the line $x$ cuts through the lower bosses, $d'$, and holes $f'$, while the upper holes, $f$, are at some distance above, this space being necessary to allow the sides of the yokes and their pins $b$ and $b'$ to pass each other as they are actuated within the ring $A'$. The relative position of the two yokes to the ring $A'$ can be clearly seen in Fig. 7, the cross-lines showing the axes of the pivots $c$ and $c'$. Were these points at right angles with each other the joint would not operate, as the yokes would not pass each other. To give sufficient room for this without separating the lines of the suspension of the yokes to the ring too far, the arms $e$ (of which there are two to each yoke) are curved to allow the end of the pins $b$ and the bosses on this yoke (through which they extend) to pass the pins $b'$ and their bosses on the yoke $C'$, as seen in Figs. 1 and 8. When the joint is operated in the direction of the arrow, Fig. 1, the pin $b$ of yoke C passes to the right of ring-pin $c'$ into the curve of arm $e'$ of yoke $C'$, while pin $b'$ passes into the curve of arm $e$ to the left of the ring-pin $c$ of yoke C, alternately approaching and receding from the central circumferential line of the ring as the joint turns. As the pins connecting each yoke with the ring revolve in separate planes, cutting the center of the axial-pin at the point of its intersection with the axial line of the shaft, (in the center of each shaft-head,) a wabbling motion is given to the yokes, the main axes of which alternately change their angles, while the axes of the ring-pins are at all times at the same degree of inclination with each other. When the motion of the coupling is reversed the relation between them is the same.

A compass-joint, B, (seen in Figs. 2, 5, and 8,) having short arms, $b''$, has each one pivoted in the center of each shaft-head, forming an extension of the line of the shafts and terminating the angle. This part of the device is supplemental.

In case of the removal of one of the shaft-bearings it facilitates the deflection of the shaft to a different angle by retaining the positive relation of the parts to each other in preventing end thrust. The position of this joint will be seen by reference to the figures, in which dotted lines show the depth to which each arm enters the head, which is to the cross-pin extending through it.

I claim as my improvement—

1. In a universal coupling, the combination, with two circular yokes, each pivoted upon an axial pin extending at right angles across it and through the shaft-head, of a wide flat circular ring inclosing said yokes and pivoted to the opposite sides thereof, the axial lines of said ring-pivots crossing each other (when extending within said ring) at an angle of about seventy degrees, so as to allow the joints of the yokes to pass each other, substantially as hereinbefore set forth.

2. In a universal coupling, the combination of two circular yokes pivoted at right angles to the shaft-heads, so as to have a free movement thereon, and a wide circular ring inclosing them, to which they are also pivoted from their opposite sides at an angle of about seventy degrees, with a compass-joint having two short arms or journals, each inserted into one of the shaft-heads, so that the latter shall turn freely upon it, thus preserving the relation of the shaft-heads to each other and allowing the deflection of either of the connected shafts to any angle desired, substantially as hereinbefore set forth.

3. In universal couplings, the combination, with the shaft-heads $a\ a'$, having yokes C C' pivoted thereto, of the ring $A'$, having holes $f f'$ and pins $b\ b'$, the axial lines of which, extended across the ring, cross each other at an angle of about seventy degrees, substantially as shown and specified, for the purpose set forth.

JOHN STATE.

Attest:
F. STATE.
B. C. CONVERSE.